Figure 1B:
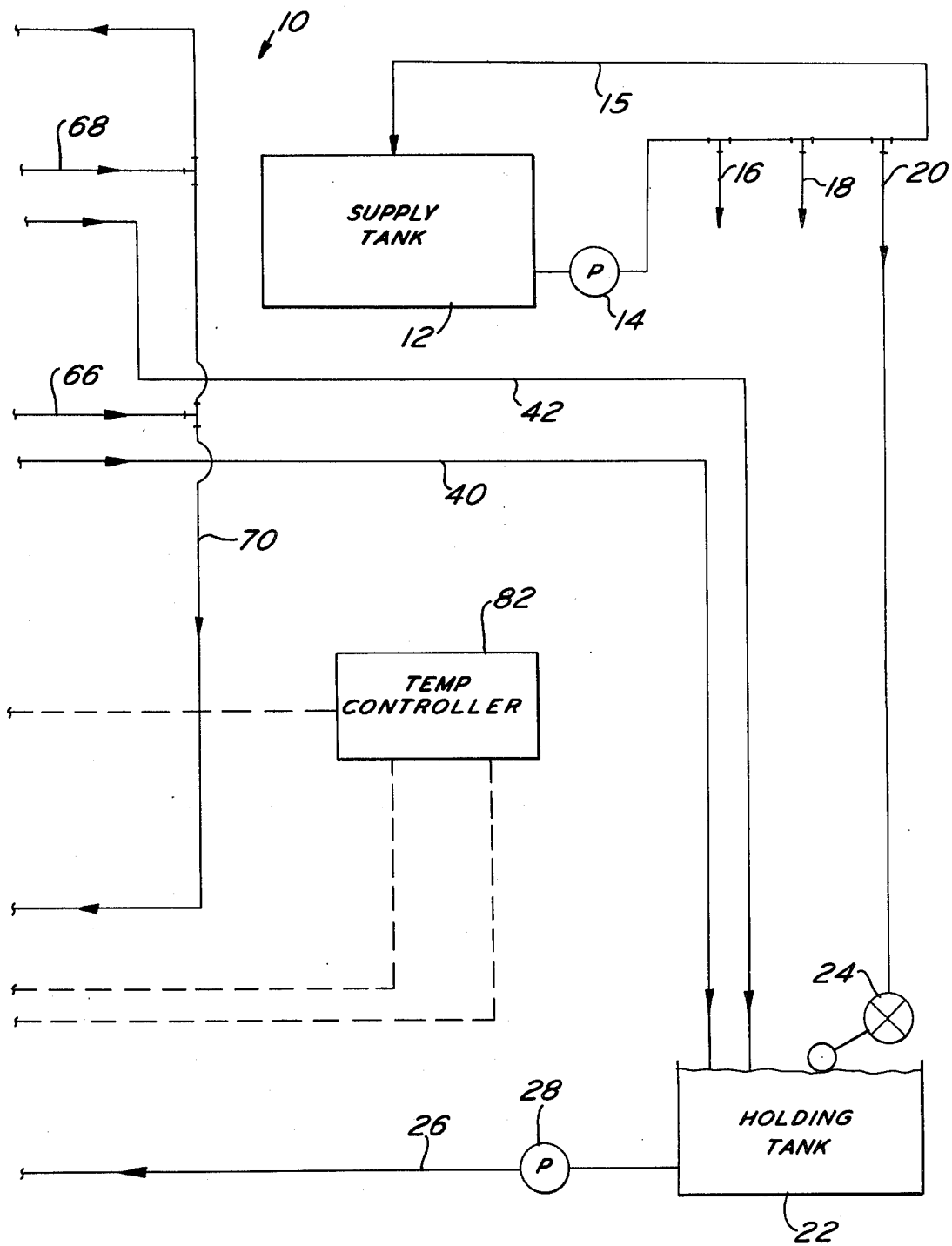

United States Patent [19]
Goettsch

[11] 3,911,179
[45] Oct. 7, 1975

[54] METHOD OF APPLYING STARCH ADHESIVE BONDING AGENT

[75] Inventor: Walter J. Goettsch, Wilmette, Ill.

[73] Assignee: Molins Machine Company, Inc., Camden, N.J.

[22] Filed: Mar. 20, 1974

[21] Appl. No.: 452,876

Related U.S. Application Data

[62] Division of Ser. No. 268,403, July 3, 1972, Pat. No. 3,827,395.

[52] U.S. Cl. .................. 427/361; 118/5; 118/202; 118/259; 118/602; 118/603; 427/366
[51] Int. Cl.² .......................................... B44D 1/44
[58] Field of Search ............ 117/65.2, 111 R, 156; 118/5, 202, 259, 602, 603; 427/361, 366

[56] References Cited
UNITED STATES PATENTS
3,511,693  5/1970  Davidson ........................... 117/102
3,750,746  8/1973  Norman ............................ 117/111 R Primary Examiner—Michael R. Lusighan
Attorney, Agent, or Firm—Seidel, Gonda & Goldhammer

[57] ABSTRACT

A method is disclosed for applying a starch adhesive bonding agent which is continuously circulated and heated to a temperature about 20°F below its gelatinization temperature. An applicator roll for applying the bonding agent is also heated by a circulation system so as to increase the temperature of any bonding agent on the roll to a desired temperature such as 2°F below gelatinization temperature.

5 Claims, 2 Drawing Figures

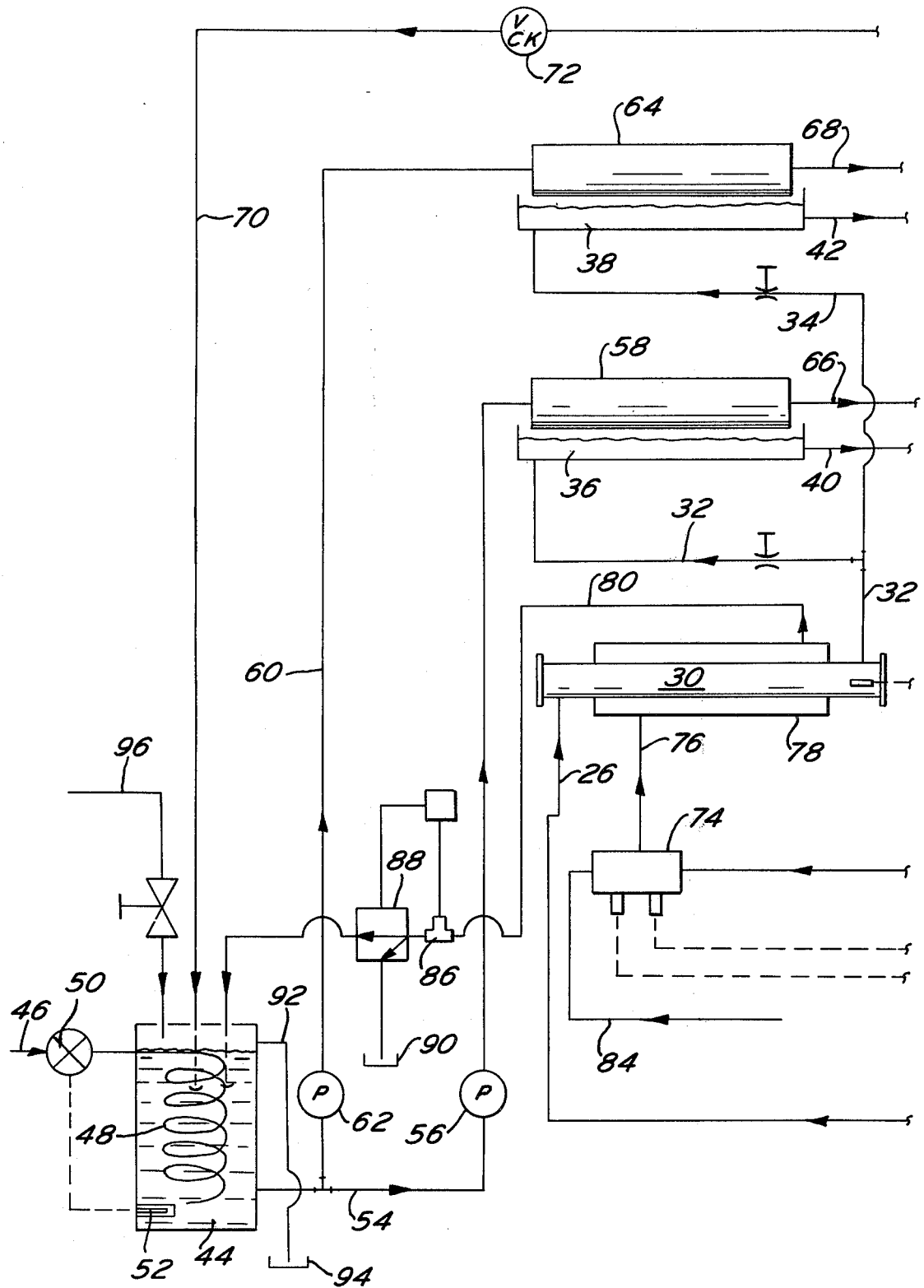
FIG. IA

3,911,179

METHOD OF APPLYING STARCH ADHESIVE BONDING AGENT

This application is a division of copending application Ser. No. 268,403, now U.S. Pat. No. 3,827,395 dated Aug. 6, 1974.

This invention relates to a starch adhesive bonding agent applicator system which is adaptable for use in a corrugator at the single facer or the double facer glue machine. Each of these machines includes an adhesive applicator roll in contact with a source of starch adhesive bonding agent. A conventional starch adhesive bonding agent gelatinizes at a temperature of approximately 145°–160°F, depending on various additives, and thereby becomes tacky so that it may act as an adhesive.

The adhesive circulation system includes means for continuously circulating the starch adhesive bonding agent at a temperature about 20°F below its gelatinization temperature. The heated bonding agent is applied to a component layer of corrugated paperboard by means of a heated applicator roll.

The applicator roll is provided with a system of heating the same so that it will further heat the previously heated adhesive bonding agent thereon to a desired temperature such as 2°F below the gelatinization temperature. The various circulation systems are provided with controls for maintaining predetermined temperature levels which preferably do not deviate by more than about 2°F. In view of the fact that the applicator rolls are heated, the previously heated adhesive bonding agent will increase to a temperature such that very little subsequent heat input is required to gelatinize the adhesive bonding agent.

Many years ago, it was suggested that it would be advantageous to circulate a starch adhesive bonding agent at a temperature slightly below its gelatinization temperature. See the article in *Paperboard Packaging*, pages 59, 60, March 1961. To my knowledge, no one has succeeded in making a system work as proposed in said article. As a practical matter, it would be extremely difficult and expensive to circulate a starch adhesive bonding agent at a temperature of 5° to 15°F below its gelatinization temperature as suggested in said article.

In the present invention the starch adhesive bonding agent is drawn from a supply tank in a primary system maintained generally at a temperature 25°F to 40°F below the gelatinization temperature of the bonding agent and transmitted as required to a holding tank in a secondary system.

The starch adhesive bonding agent is circulated in the secondary system by pump means and its temperature is raised by heating means to a level approximately 20°F below the gelatinization temperature. For practical reasons it is desirable to have as small a spread as possible between the temperature of the adhesive in the secondary system and the gelatinization temperature, without incurring detrimental changes in adhesive viscosity. It should also be noted that the viscosity and temperature sensitivity of different starch adhesives varies depending on their formulation and that some starch adhesives can be successfully utilized with a spread of less than 20°F.

The increase in temperature of the adhesive bonding agent circulating in the secondary system is effected principally by the relatively constant heat input from the heated applicator rolls. The heat exchanger modulates this heat input as demand for the bonding agent varies.

It is important that, regardless of variations in operating conditions, the temperature of the adhesive in the secondary system be held within ±2°F of the desired level. It must also be understood that the normal operation of a corrugating machine involves running at various speeds as well as temporary shut-downs, and that these, in turn, cause appreciable variations in adhesive demand or occasional complete cessation of adhesive demand.

To maintain the temperature level of the adhesive in the secondary system when little or no new cooler adhesive is being added from the primary system, cooling water is thermostatically circulated through the heat exchanger.

Circulation of the adhesive in the secondary system is maintained at a uniform, relatively high flow rate, well above that normally used in existing conventional systems. I have found that a flow rate in excess of 25 gallons per minute is needed for optimum operation of my system.

The idle speed of the applicator roll is also maintained at a substantially higher rate. The applicator roll idling speed is preferably 75 to 100 surface feet per minute.

The combination of the high flow rate of the adhesive bonding agent in the secondary system, the stabilization of temperature level provided by the thermostatically controlled heat exchanger and the high idling speed of the applicator roll provide the unexpected results achieved by my adhesive application system.

It is an object of the present invention to provide a novel method for applying a starch adhesive bonding agent.

It is another object of the present invention to provide method for applying starch adhesive bonding agent in a manner which requires minimum heat input to gelatinize the agent while at the same time being reliable and capable of adjustment.

Another object of this invention is to provide a starch adhesive bonding agent circulation method which has high flow rate at stable temperatures about 20° below the gelatinization temperature.

Other objects will appear hereinafter.

For the purpose of illustrating the invention, there is shown in the drawings a form which is presently preferred; it being understood, however, that this invention is not limited to the precise arrangements and instrumentalities shown.

FIGS. 1A and 1B illustrate a glue machine for use in practicing the method of the present invention including circuitry associated therewith which has been illustrated schematically.

Referring to the drawing, wherein like numerals indicate like elements, there is shown a glue machine in accordance with the present invention designated generally as 10. A supply tank 12 of a primary system is provided for housing the supply of a starch adhesive bonding agent at a temperature in the range of about 100°F to 130°F. A pump 14 has its inlet connected to the supply tank 12. The outlet conduit 15 from the pump 14 returns to the tank 12. Conduits 16, 18 and 20 are connected to conduit 15.

Conduits 16 and 18 may be coupled to circuitry associated with single facers. Conduit 20 is associated with the glue machine 10. Hence, only the circuitry associated with conduit 20 will be described herein, with the understanding that similar type circuitry would be coupled to the conduits 16 and 18.

The conduit 20 is adapted to transmit the starch adhesive bonding agent to a holding tank 22 of a secondary system. Flow from conduit 20 into the tank 22 is controlled by any suitable type valve and is preferably a float-operated valve 24. In this manner, a uniform level of starch adhesive bonding agent may be automatically maintained at a predetermined level to insure an adequate supply. Once the adhesive starch bonding agent enters the tank 22, it never returns to the supply tank 12. It will be understood that the size of holding tank 22 is substantially smaller than the size of supply tank 12.

The tank 22 is provided with an outlet conduit 26 containing a pump 28. Pump 28 may assume a wide variety of types. I prefer to use a commercially available pump having a large capacity such as 25 to 40 gallons per minute so as to effect a high flow rate in the secondary system.

Conduit 26 is connected to one end of the heat exchanger 30. The bonding agent flows through the heat exchanger 30 and exits therefrom by way of conduit 32. Conduit 32 contains a shut-off valve to stop flow for service shut-downs or wash-up, and is connected to the inlet of a tray-like housing 36.

A conduit 34 is connected to conduit 32 and likewise has a shut-off valve therein. Conduit 34 is connected to the inlet of a similar tray-like housing 38. Housing 36 has an outlet connected to conduit 40. Housing 38 has an outlet connected to conduit 42. The conduits 40 and 42 return the bonding agent to the holding tank 22.

While a pair of tray-like housings for the bonding agent is illustrated, it will be appreciated that more than two or only a single tray-like housing may be utilized, if desired. It will be noted that a closed circulation secondary system has been provided for the starch adhesive bonding agent beginning with the tank 22, from which the bonding agent is pumped under pressure through the heat exchanger 30, through one or both of the housings 36, 38, and then returned to the tank 22. As the starch adhesive bonding agent flows through the heat exchanger 30, its temperature is raised to a temperature below its gelatinization temperature. As is well known to those skilled in the art, the gelatinization temperature of a particular formulation of starch adhesive will vary depending upon the ingredients thereof, such as caustic soda.

As shown in FIG. 1A, there is provided a heater tank 44 containing a supply of water. A steam supply conduit 46 is connected to tank 44 and terminates therein as a coil 48. Steam exiting from the coil 48 bubbles upwardly through the water and heats the same. The temperature of the water is detected by a thermostat 52 or other comparable temperature detector, which is connected to and controls a valve 50 in conduit 46.

An outlet conduit 54 from the tank 44 contains a pump 56. Pump 56 forces the heated water under pressure through an adhesive applicator roll 58 preferably of the gravure type.

A water supply conduit 60 has one end connected to the conduit 54. The other end of conduit 60 is connected to the inlet of a similar applicator roll 64. Conduit 60 contains a pump 62 which is similar to pump 56. The applicator rolls 58 and 64 are heated by the water as it flows therethrough. The heated water supplied to the inlet of the hollow applicator rolls 58 and 64 is at a temperature about 10°F above the gelatinization temperature of the starch adhesive bonding agent so that the surface of the applicator rolls 58 and 64 will be at a proper temperature to raise the starch adhesive bonding agent thereon to a temperature about 2°F below the gelatinization temperature thereof.

The applicator rolls 58 and 64 cause the temperature of the starch adhesive bonding agent in housings 36 and 38 to increase. To prevent this undesired increase in temperature which could cause premature gelatinization during idling operation, the idling speed of the rolls 58 and 64 is maintained at about 70–100 surface feet per minute. The conduit 68 connects the outlet of applicator roll 64 to a distribution conduit 70. Likewise, a conduit 66 connects the outlet of applicator roll 58 to the distribution conduit 70.

Conduit 70 is comprised of two branches. One branch extends back to the tank 44 and contains a check valve 72. The other branch of conduit 70 communicates with the jacket 78 of the heat exchanger 30 by way of conduit 76. A valve 74, such as a solenoid operated valve, controls flow from conduit 70 to conduit 76. Valve 74 is controlled by a temperature controller 82 which in turn has a thermocouple or other temperature detector 29 connected to the heat exchanger 30. Depending upon the detected temperature of heat exchanger 30, the preheated water from conduit 70 may flow through the jacket 78 of the heat exchanger. Alternatively, if the temperature of the bonding agent in heat exchanger 30 is too high, valve 74 may permit cooler water to flow from conduit 84 through conduit 76.

The outlet of the jacket 78 is connected to the tank 44 by way of conduit 80. Conduit 80 includes a temperature sensor 86 which controls a valve 88. Valve 88 will divert the circulating water to the tank 44 or to a drain 90 depending upon the temperature of the circulating water. If the circulating water is below a preset temperature, such as water from conduit 84, it will be diverted by valve 88 to the drain 90. Otherwise, the recirculated water will be returned to the tank 44. Tank 44 includes an overflow conduit 92 connected to a drain 94.

The operation of the invention is as follows. Since the complete system includes a dual closed circulation system for the starch adhesive bonding agent as well as a dual circulation system for the heated water, only a single system will be described hereinafter. It is assumed that the particular formulation of starch adhesive bonding agent gelatinizes at 145°F.

Float control valve 24 maintains the level of the starch adhesive bonding agent in holding tank 22 at a predetermined level. As the starch adhesive bonding agent is consumed, additional make-up bonding agent is introduced into tank 22 from tank 12 by way of conduit 20.

The starch adhesive bonding agent is pumped under pressure from tank 22 at a high flow rate through the heat exchanger 30 which in combination with the heated applicator rolls raises and maintains the temperature of the bonding agent so as to be about 20°F below the gelatinization temperature of the starch adhesive bonding agent, namely 125°–127°F. The thusly heated starch adhesive bonding agent then flows through the housing 36 and is returned by gravity to the tank 22 via conduit 40.

Heated water is pumped under pressure at a temperature of about 155°F through the applicator roll 58 and returned to the tank 44 via conduit 70 or conduit 80. If the temperature of the bonding agent detected at the heat exchanger 30 is below the predetermined temperature, controller 82 operates valve 74 to permit some of the heated water in conduit 70 to flow through the jacket of the heat exchanger 30 to increase the temperature thereof.

Each of the applicator rolls is rotatably driven about its longitudinal axis at a speed comparable to the speed of the paperboard which may be 100 to 700 feet per minute. Applicator roll 58 applies the starch adhesive bonding agent from housing 36 to the crests of flutes on single-faced paperboard so that a liner may be adhesively bonded thereto in a double facer. In the double facer, the temperature of the starch adhesive bonding agent will be promptly increased about 2°F so as to gelatinize the bonding agent and effect a bond between the liner and the crests of the flutes on the single-faced board, thereby making double-faced paperboard.

This bond will then be strengthened by a further increase in temperature which accelerates reduction of the water component of the starch adhesive bonding agent. This strengthening of the bond enables the double-faced (or multiwalled) paperboard to withstand the mechanical stresses imposed by the subsequent slitting and scoring operation. It must be recognized that water loss prior to gelatinization is detrimental since it results in a very poor bond — or no bond — whereas water loss subsequent to gelatinization is helpful since it strengthens the bond and thus permits increased operating speeds.

The applicator roll 58 is heated so that its peripheral surface temperature will increase the starch adhesive bonding agent thereon to the predetermined temperature about 2° below gelatinization point. While the hot water enters the roll 58 at a temperature of about 155°F, due to radiation losses and contact with cooler adhesive the surface of roll 58 will be about 143°F. The thickness of the starch adhesive bonding agent on the applicator roll 58 may be controlled by a doctor blade or a doctor roll.

Caustic soda has been used as an ingredient in the starch adhesive formulation heretofore to reduce water loss from the agent to the paper during that period of time wherein the starch adhesive bonding agent is in contact with the paper, but is below the starch gelatinization temperature. The present invention reduces the length of time between application of adhesive bonding agent to the paperboard and gelatinization of the starch in the adhesive bonding agent, thereby permitting use of less caustic soda as an ingredient in the starch adhesive bonding agent formulation. This reduces some of the undesirable side effects of caustic soda, such as degradation of the adhesive.

It is to be emphasized that the capacity of the housing 36 is larger than the capacity of holding tank 22. Further, the heat exchanger 30 is used to maintain the temperature of the starch adhesive bonding agent at a stable level about 20°F below its gelatinization temperature through the entire secondary system. Any starch adhesive bonding agent which is not applied by the applicator roll immediately flows through the housing 36 and is returned to the holding tank 22. When the corrugating machine is idling and no lower temperature adhesive is being added to the secondary system, the high idling speed of 70 to 100 surface feet per minute of the applicator roll prevents gelatinization of the bonding agent on the surface of the roll. The heat exchanger 30 also cools the bonding agent, by using water from conduit 84, to offset heat applied to the bonding agent in the housings 36, 38 by the rolls. To maintain uniformity of temperature level, all conduits in the secondary system are insulated.

Most of the heat required to raise the temperature of the starch adhesive bonding agent is furnished by the applicator rolls 58 and 64. The primary function of the heat exchanger 30 during operation is to maintain the temperature of the bonding agent stable by heating or cooling the same as it flows therethrough. The high flow rate of the bonding agent creates turbulence in the housings 36 and 38 which has a washing effect on the surface of the applicator rolls to dislodge any partially gelled particles thereon while at the same time reduces variations in the surface temperature of the applicator rolls.

As a result of the structural interrelationship of the system disclosed herein, it is now possible to attain the advantages of more uniform paperboard, shorter length of double-facer, reduction in consumption of caustic soda, increased film strength for starch adhesive, reduction in the time that the starch adhesive bonding agent is in an ungelatinized state on the crests of the flutes of the single-faced paperboard which decreases the water loss to the paperboard, increased bond strength, more efficient heat utilization, and increased speed of production.

The present invention may be embodied in other specific forms without departing from the spirit or essential attributes thereof and, accordingly, reference should be made to the appended claims, rather than to the foregoing specification as indicating the scope of the invention.

I claim:

1. A method for applying a starch adhesive bonding agent to a component of a moving web of corrugated paperboard comprising providing a housing containing a supply of the bonding agent and an applicator roll associated therewith for applying the bonding agent to said component, circulating the bonding agent at a rate of flow in excess of 25 gallons per minute from a tank through said housing and back to said tank at a uniform temperature about 15°–20° F. below the gelatinization temperature of the bonding agent, maintaining the temperature of the circulating bonding agent stable at said uniform temperature by means of a heat exchanger between said tank and housing, heating said applicator roll so that it will increase the temperature of the bonding agent on the surface thereof from said uniform temperature to a temperature about 2°F. below the gelatinization temperature of the starch adhesive bonding agent, and applying said bonding agent to said web by said applicator roll.

2. A method in accordance with claim 1 including rotating said applicator roll at a speed corresponding to the speed of the web of corrugated paperboard while applying the bonding agent to the web of corrugated paperboard, and decreasing the speed of rotation of said applicator roll to about 70–100 surface feet per minute when no web of corrugated paperboard is being fed.

3. A method in accordance with claim 1 including circulating heated water through said applicator roll at a temperature about 10°F. above the gelatinization temperature of the starch adhesive bonding agent.

4. A method in accordance with claim 1 including providing a supply tank for said bonding agent, withdrawing said bonding agent from said supply tank and delivering it to said first mentioned tank in a manner which precludes return of said bonding agent from said first tank to said supply tank.

5. A method for applying a starch adhesive bonding agent to corrugated paperboard comprising providing a housing containing a supply of adhesive bonding agent and an applicator roll associated therewith for applying the bonding agent to paperboard, circulating the bonding agent at a rate of flow in excess of 25 gallons per minute from a tank through said housing and back to said tank at a uniform temperature about 15°–20°F. below the gelatinization temperature of said bonding agent, maintaining the temperature of said bonding agent stable at said uniform temperature by means of a heat exchanger capable of adding to or subtracting from the temperature of the bonding agent, and heating said applicator roll by flowing hot water therethrough so that it surface temperature will increase the temperature of said adhesive bonding agent from said uniform temperature to a temperature about several degrees below the gelatinization temperature of said bonding agent, and using at least some of said hot water after flowing through said applicator roll to perform said maintaining step.

* * * * *